(12) United States Patent
O'Connor et al.

(10) Patent No.: US 7,703,828 B2
(45) Date of Patent: Apr. 27, 2010

(54) LATCH SYSTEM FOR RELEASABLY SECURING A SEAT TO A FLOOR (75) Inventors: James G. O'Connor, Oxford, MI (US); Chad Balk, Birmingham, MI (US)

(73) Assignee: Lear Corporation, Southfield, MI (US)

( * ) Notice: Subject to any disclaimer, the term of this patent is extended or adjusted under 35 U.S.C. 154(b) by 260 days.

(21) Appl. No.: 11/881,124

(22) Filed: Jul. 25, 2007

(65) Prior Publication Data
US 2009/0026790 A1    Jan. 29, 2009

(51) Int. Cl.
*B60N 2/02* (2006.01)
(52) U.S. Cl. ............. 296/65.01; 296/65.05; 297/378.13
(58) Field of Classification Search .............. 296/65.01, 296/65.05; 297/325, 326, 316, 331, 335, 297/336, 378.1, 378.13
See application file for complete search history.

(56) References Cited

U.S. PATENT DOCUMENTS

| | | | |
|---|---|---|---|
| 6,820,912 B1 | 11/2004 | Lavoie | |
| 6,945,585 B1 * | 9/2005 | Liu et al. | 296/65.03 |
| 7,044,552 B2 | 5/2006 | Müller et al. | |
| 2007/0152484 A1 | 7/2007 | Palomba | |

* cited by examiner

*Primary Examiner*—Lori L Lyjak
(74) *Attorney, Agent, or Firm*—MacMillan, Sobanski & Todd, LLC (57) ABSTRACT

A vehicle seat latching system having four anchor mounting points wherein three of the four points define an engagement plane with respect to a vehicle floor. The fourth mounting point is located in a non-planar orientation to the engagement plane. A compensating latch is provided as part of the fourth mounting point to engage a mating element in a non-planar orientation. The compensating latch has a reduced engagement and release force characteristic.

20 Claims, 4 Drawing Sheets

LATCH SYSTEM FOR RELEASABLY SECURING A SEAT TO A FLOOR

BACKGROUND OF THE INVENTION

This invention relates in general to systems for releasably securing an apparatus to a support surface. In particular, this invention relates to an improved latch system for releasably securing a seat to a floor, such as in a vehicle.

Virtually all vehicles are provided with one or more seats that are secured to a support surface, such as a floor, for supporting passengers thereon during operation of the vehicle. In many instances, it is desirable to use the vehicle to transport cargo in addition to or in lieu of passengers. Most vehicles are provided with a predetermined amount of cargo space for this purpose. Unfortunately, when the cargo to be transported is relatively large in size, it may not fit conveniently within the cargo space that is provided within the vehicle. To address this, it is known to releasably secure one or more of the seats to the floor of the vehicle. Such releasable securement allows some or all of the seats to be removed from the vehicle, thereby significantly increasing the amount of cargo space that is available for use.

A variety of latch systems are known in the art for releasably securing the seat to the floor of the vehicle. In some instances, the seat is provided with a pair of hooked-shaped pivot mechanisms on a first end of the seat and a pair of releasable latch mechanisms on a second end of the seat. To install the seat within the vehicle, the seat is initially oriented at an angle relative to the floor and moved such that the pivot mechanisms provided on the first end of the seat engage a corresponding first pair of generally inverted U-shaped striker pins provided on the floor of the vehicle. Then, the seat is tilted downwardly such that the latch mechanisms provided on the second end of the seat engage a corresponding second pair of generally inverted U-shaped striker pins also provided on the floor of the vehicle. The latch mechanisms are then engaged to positively secure the seat to the floor of the vehicle. When so secured, the seat can be reliably used to support passengers within the vehicle during operation. To remove the seat from the vehicle, the latch mechanisms are disengaged, and the installation process is reversed.

Although latch systems of this general type have functioned effectively, it has been found that the pivot mechanisms and the latch mechanisms provided on the bottom of the seat are not always precisely positioned relative to the associated striker pins provided on the floor of the vehicle. Such imprecise relative positioning can occur as a result of manufacturing tolerances associated with manufacture of both the seat and the vehicle. In some instances, this imprecise relative positioning can result in an undesirable misalignment between the one or more of the pivot mechanisms and the latch mechanisms provided on the bottom of the seat and the associated striker pins provided on the floor of the vehicle. As a result of these misalignments, an undesirably large amount of force may be required to engage and disengage the latch mechanisms because some rigid portion of either the seat or the floor of the vehicle must be deformed in order to engage and disengage the latch mechanisms.

To minimize the undesirable effects of these misalignments, it is known to provide each of the latch mechanisms with a resilient structure, such as a rubber cushion, that engages the associated striker pin. When the latch mechanisms are engaged, rigid portions thereof extend about the associated striker pins with relatively small clearances therebetween. At the same time, however, the resilient structures are compressed against the associated striker pins to take up these clearances. Consequently, the amount of force that is required to engage and disengage the latch mechanisms is reduced, even when the pivot mechanisms and the latch mechanisms provided on the bottom of the seat are not precisely positioned relative to the associated striker pins provided on the floor of the vehicle.

Unfortunately, because they are constantly subjected to compressive forces when the seat is installed within the vehicle, it has been found that these rubber cushions can lose their resiliency after a period of use and, as a result, become permanently deformed. When this occurs, relatively small clearances are again created between the latch mechanisms and the associated striker pins. Such clearances can allow undesirable movement of the seat relative to the vehicle, resulting in the generation of rattling noises during operation of the vehicle. This situation is particularly problematic when the seat is unoccupied or only lightly loaded. Thus, it would be desirable to provide an latch system for releasably securing a seat to a floor, such as in a vehicle, that addresses these issues.

SUMMARY OF THE INVENTION

This invention relates to an improved latch system for releasably securing a seat to a floor, such as in a vehicle. The vehicle seat latching system includes a vehicle seat assembly having a frame. A first pair of anchor points is provided, and each of the first pair of anchor points has a fixed restraining characteristic in a first direction and is operatively connected to the frame in a first and a second position. A second pair of anchor points is also provided, and each of the second pair of anchor points is operatively connected to the frame in a third and fourth position. One of the second pair of anchor points in the third position has a fixed restraining characteristic in the first direction, and the remaining one of the second pair of anchor points in the fourth position has a compliant restraining characteristic in the first direction. The anchor points of the first, second, and third positions cooperate to form a plane of engagement with a first, second, and third corresponding mating element. The anchor point of the fourth position operatively engages a fourth corresponding mating element that is in a non-planar relationship with the plane of engagement of the first, second, and third corresponding mating elements.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
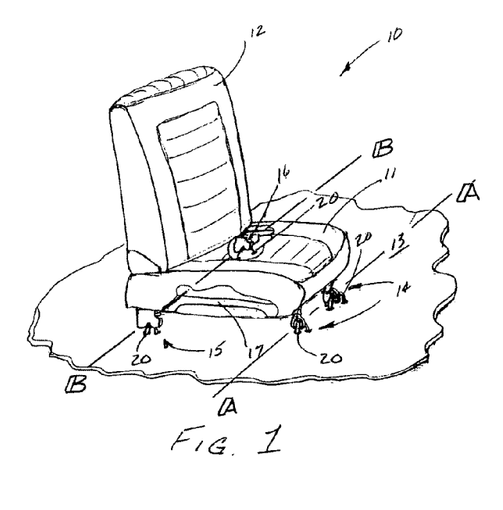
FIG. 1 is a side perspective view, partially broken away, of a seat assembly including a latch system for releasably securing the seat to a floor of a vehicle in accordance with this invention.

Referring now to the drawings, there is illustrated in FIG. 1 a seat assembly, indicated generally at 10, for use in a vehicle in accordance with this invention. The illustrated seat assembly 10 is, in large measure, conventional in the art and is intended merely to illustrate one environment in which this invention may be used. Thus, the scope of this invention is not intended to be limited for use with the specific structure for the seat assembly 10 illustrated in FIG. 1 or with vehicle seat assemblies in general. On the contrary, as will become apparent below, this invention may be used to releasably secure any desired apparatus to any desired support surface in the manner described below.

The illustrated seat assembly 10 includes a generally horizontally extending seat portion 11, a generally vertically extending back portion 12, a seat frame 17 and a plurality of anchoring points, indicated generally at 14, 15, and 16. Each of the anchor points 14, 15 and 16 includes a striker pin or bar 20 which is conventional and well known in the art. The striker pin 20 may be formed in an inverted "U" shape having an open end anchored to, for example, a floor section 13 and a closed end positioned for cooperative engagement with a mating anchor point. Though shown and described as a "U" shaped structure, the striker pins 20 may be other than illustrated if so desired, such as for example bars, "V" shaped elements, stamped clasps, recess-and-lip structures, and the like. The closed end portion of the striker pin 20 may engage the mating anchor point 14, 15, and 16. The striker pins or bars 20 which are conventional in the art may be fixed to the floor section 13 by any suitable method including threading, bolting, welding, adhesive bonding and the like. Further, the striker pins or bars may be formed as an integral part of the floor 13 if so desired. Though conventionally made of steel, the striker pins 20 may be made from any suitable material and remain within the scope of the present invention.

Figure 5A:
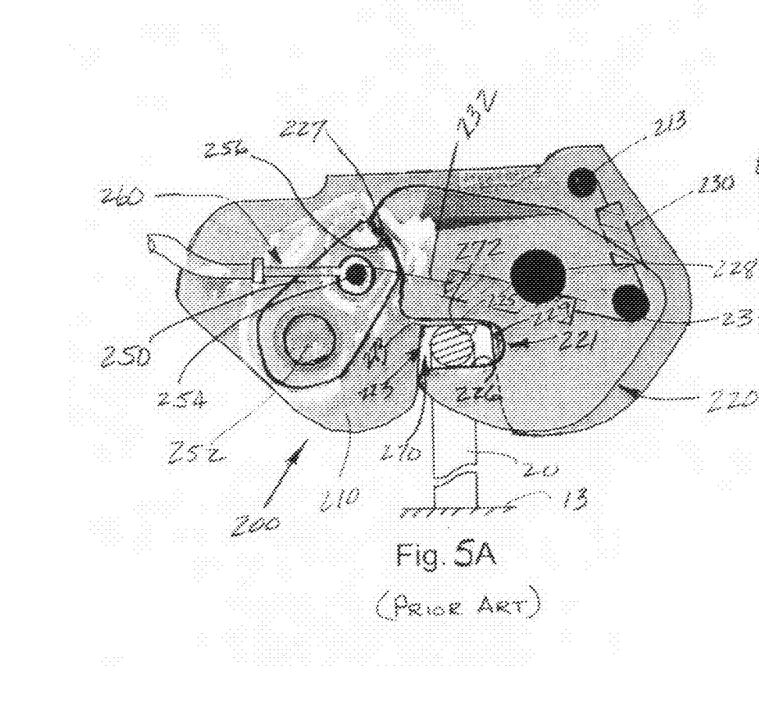
FIG. 5A is an enlarged side elevational view, partially in cross section, of a prior art latch mechanism and striker pin assembly that is shown in an engaged position relative to a striker pin.
Figure 5B:
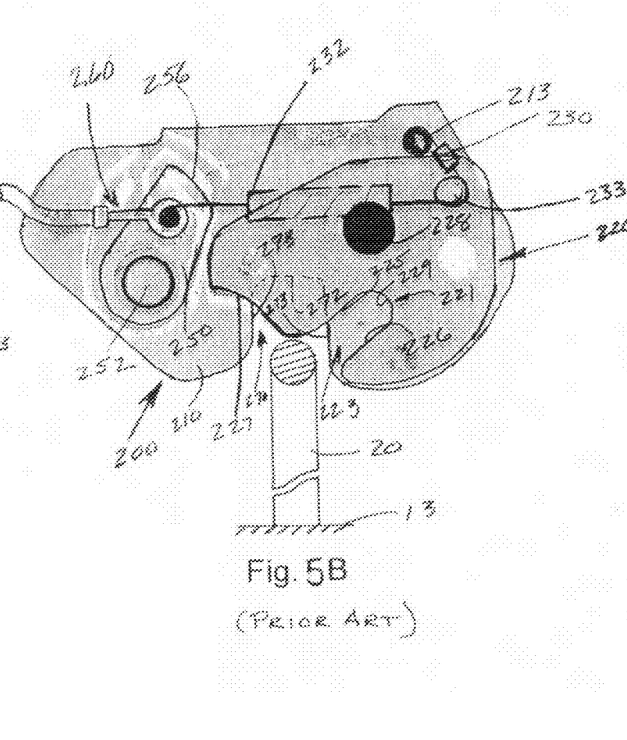
FIG. 5B is a side elevational view similar to FIG. 5A, wherein the prior art latch mechanism is shown in a disengaged condition relative to the striker pin.
Figure 6A:
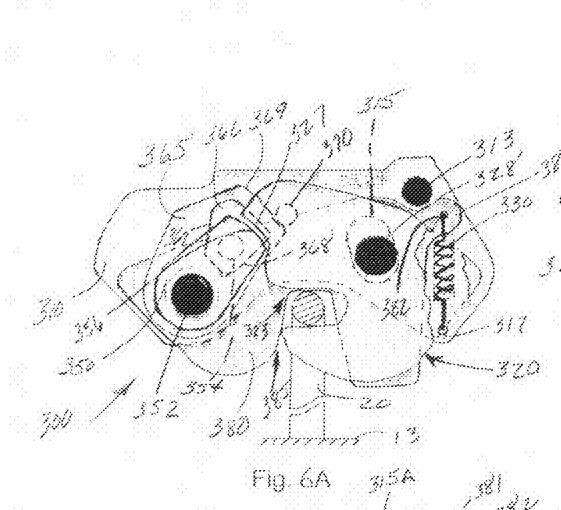
FIG. 6A is an enlarged side elevational view, partially in cross section, of a third embodiment of a latch mechanism and striker pin assembly that can be used in the latch system illustrated in FIGS. 1 and 2C, wherein the latch mechanism is shown in an engaged position relative to a striker pin.
Figure 6B:
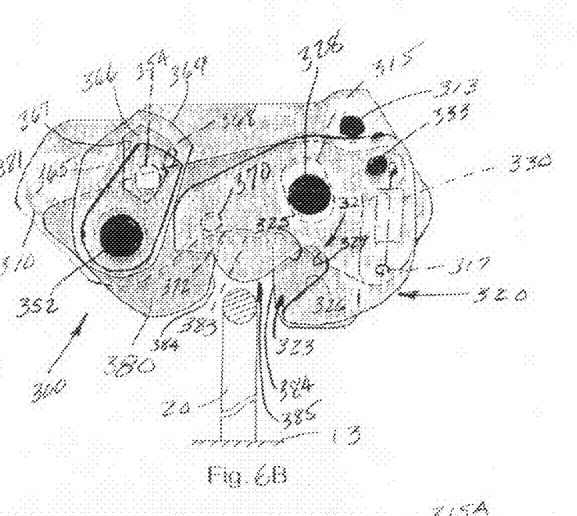
FIG. 6B is a side elevational view similar to FIG. 6A, wherein the latch mechanism is shown in a disengaged condition relative to the striker pin.

The forward anchor points 14 may include a pair of cooperating releasable forward pivots 14. The releasable forward pivots 14 may be configured to allow the seat assembly 10 to be released from the striker pins 20 or other hinging or pivoting mechanisms (not shown) for removal from the vehicle. The releasable forward pivots may further provide for the seat assembly 10 to be rotated into a storage position within the vehicle and not released from the forward striker pins or hinging mechanisms. Alternatively, the forward pivots may be of a non-releasable, pivoting construction if so desired. The forward anchor points, whether releasable or non-releasable, may provide for at least rotation of the seat assembly about an axis A-A, as shown in FIGS. 1 and 2A-C. The forward anchor points 14 may alternatively be of a releasable blocker-type latch apparatus, as shown in FIGS. 3A and 3B, or a releasable cinch-type latch, as shown in FIGS. 5A and 5B, or a compensating latch apparatus, as shown in FIGS. 6A and 6B, or any combination thereof if so desired.

Figures 2A, 2B, 2C:
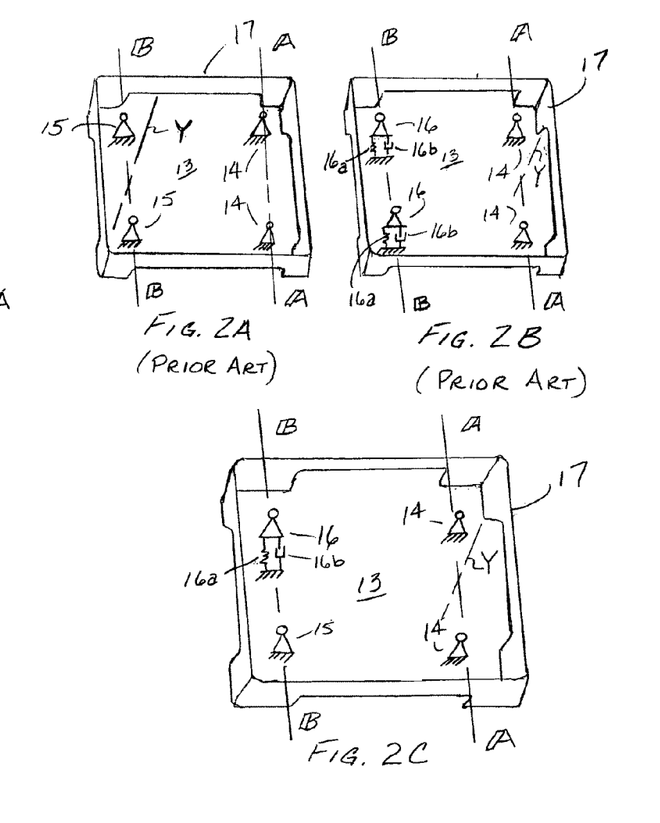
FIG. 2A is a schematic top perspective view of a first prior art latch system for releasably securing a seat to a floor of a vehicle.
FIG. 2B is a schematic top perspective view of a second prior art latch system for releasably securing a seat to a floor of a vehicle.
FIG. 2C is a schematic top perspective view of a latch system for releasably securing a seat to a floor of a vehicle in accordance with this invention.
Figure 3A:
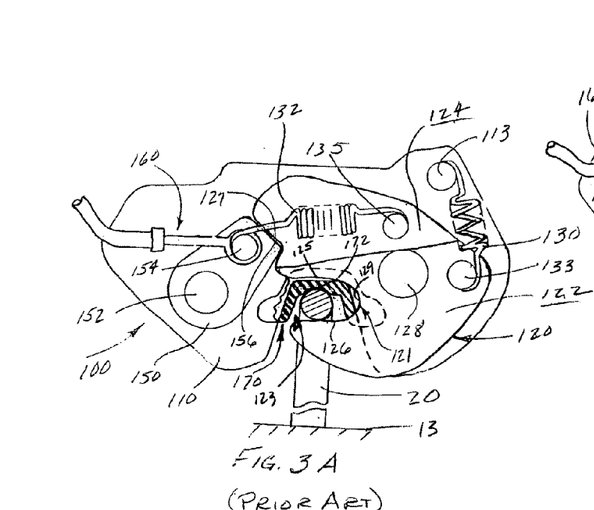
FIG. 3A is an enlarged side elevational view, partially in cross section, of a first embodiment of a latch mechanism and striker pin assembly that can be used in the latch system illustrated in FIGS. 1 and 2C, wherein the latch mechanism is shown in an engaged position relative to a striker pin.
Figure 3B:
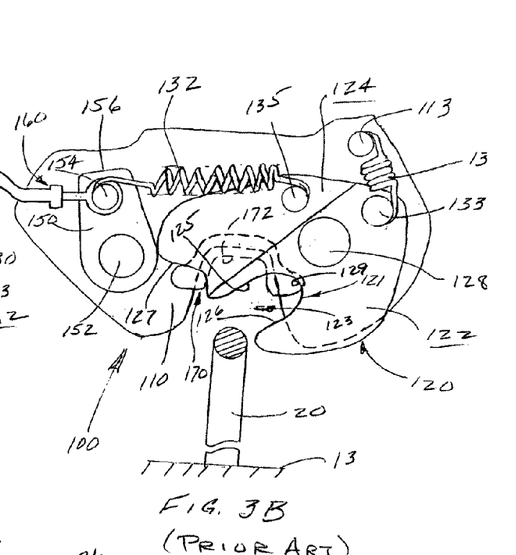
FIG. 3B is a side elevational view similar to FIG. 3A, wherein the latch mechanism is shown in a disengaged condition relative to the striker pin.

The prior art seat frame 17, as illustrated in FIGS. 2A and 2B, includes a plurality of anchor points indicated generally at 14, 15 and 16. The forward anchor points 14 are generally in line with the axis A-A. The rearward anchor points 15 or 16 are generally in line with an axis B-B, as shown in FIGS. 2A and 2B. The anchor points 14 may be typically provided as a pair of hook and striker anchors (not shown) which are conventional in the art. Alternatively the anchor points 14 may be provided as a pair of hinged anchors. The rearward anchor points of the prior art seat frame 17 include a pair of releasable latches, shown generally at 15 in FIG. 2A or at 16 in FIG. 2B. The pair of latches may be provided as vertically fixed latches 15, similar to that illustrated in FIGS. 5A and 5B, or may alternatively be provided as a pair of vertically compliant latches 16, similar to that illustrated in FIGS. 3A and 3B, if so desired. The prior art latching systems of FIGS. 2A and 2B provide rearward latch apparatuses of the same style of construction on the axis B-B of the seat frame 17.

FIGS. 2A and 2B further depict a schematic representation of the relative mounting characteristics of each anchor point 14, 15, and 16. A vertical axis Y is shown in FIG. 2A as having an orientation substantially perpendicular to the axis B-B and the floor 13 and also in a direction generally parallel with the vertical seat back 12 of FIG. 1. It should be understood however, that the vertical axis Y is equally applicable and transferable to any other point of, within, or in proximity to the seat frame 17. The representations in FIG. 2A of anchor points 14 and 15 define the vertical stiffness characteristics of the vertically fixed latches 15 and the forward pivot anchors 14 as relatively rigid in a vertical direction parallel with the vertical axis Y. The relatively rigid vertical stiffness characteristic of the vertically fixed, engaged anchors 14 and 15 provides a clamped contact between the latch mechanism and the striker pin having no appreciable vertical clearances therebetween when in the engaged position. The clearances associated with the forward pivots 14 may however be sufficient for providing rotation about the engaged striker pin or hinge pin structure. The relatively rigid vertical stiffness characteristic further provides a negligible cushioning and/or dampening quality to the connection between the seat frame 17 and the striker pins 20.

FIG. 2B depicts an alternative prior art seat mounting arrangement of the seat frame 17 and the anchor points 14 and 16. The anchor points 14 are similar to those described in FIG. 2A and may be relatively rigid in the vertical axis Y. Alternatively, the anchor points 14 may have some minimal relative compliance in the vertical axis Y but are generally of the same magnitude at each point along axis A-A. The anchor points 16, shown generally in line with axis B-B, may be vertically compliant latches, similar to those shown in FIGS. 3A and B. The anchor points 16 are further depicted as preferably having a vertical spring characteristic 16a and a vertical damping characteristic 16b. The spring characteristic 16a and the damping characteristic 16b may be material properties of a resilient member, such as exhibited by an elastomer like neoprene or natural rubber and the like, or a separate spring element along with an optional dashpot structure. The vertical spring characteristic 16a may be produced by a mechanical spring such as for example a coil spring, torsion bar spring, or "C"-clip spring and the like. The vertical spring characteristic 16a and the vertical damping characteristic 16b may however be generated by generally non-mechanical devices such as repelling magnets or magnetic fields, compressible fluids, such as gas springs, and the like. The vertical spring characteristic 16a is further characterized by an output force that is responsive to a change in distance or deflection of the structure and is generally conventional and known in the art. The damping characteristic 16b is characterized by an output force that is responsive to a velocity input and is generally conventional and known in the art. The vertical damping characteristic 16b is an optional force responsive characteristic that may be omitted if so desired. The vertical spring and damping characteristics 16a, 16b of anchor points 16 are generally of the same magnitude along axis B-B. The striker pins 20 are rigidly mounted to the vehicle floor 13 as described above.

Typically when providing for cargo space, the vehicle seat assembly 10 of FIG. 1 is installed or stored in a vehicle in a folded condition where the back 12 is substantially parallel to seat 11, though such is not required. During installation, the seat assembly 10 is typically first located on axis A-A by anchor points 14 and striker pins 20 or an alternative hinge mechanism (not shown). The seat assembly 10 is then rotated in a generally counterclockwise direction until the rearward latches 15 or 16 are engaged with striker pins 20. The striker pins 20 are substantially in line with axis B-B and are rigidly mounted to the vehicle floor 13.

The difficulty in securing both pair of rearward latches 15 or 16 is due, in large part, to the out-of-plane tolerance associated with the locations of the striker pin 20 on the floor 13 as illustrated in FIG. 1. It is generally well known that three points of reference adequately define a plane. In the case of a seat latching system, there are typically four locating and anchoring points. The first three points of engagement, typically the two forward points 14, along axis A-A, and one of the rearward points 15 or 16, of FIG. 2A or 2B, adequately form a plane of engagement allowing the three anchor points to be easily and positively engaged with the mating striker pins 20. The mating location of the fourth anchor point 15 or 16 and the corresponding striker pin 20 is typically in a non-planar relationship with the three engaged anchor points based on normal manufacturing and assembly tolerances. As such, an undesirably excessive force may be required to engage the remaining anchor point. Once the seat assembly 10 is completely engaged, an undesirably excessive release force may result from the non-planar relationship of all anchor points.

FIG. 2C shows a latch and mounting arrangement of the present invention as a schematic representation of the mounting conditions relative to the axis Y. The forward anchor points 14 are located along the axis A-A. The rearward anchor points 15 and 16 are located along the axis B-B. The anchor points 14, 15, and 16 are provided with the various vertical stiffness characteristics as described above. In an embodiment of the present invention, the anchor points 14 and 16 are engaged in a plane with the remaining anchor point 15 being unsecured as described above. The fourth anchor point 15 may be engaged to the striker pin 20 in a conventional manner by compression of the vertical spring characteristic 16a. Additionally the seat frame 17 may be deflected if the non-planar tolerances are significantly large. Alternatively, the anchor points 14 and 15 may also be engaged in a plane with the remaining anchor point 16 being unsecured as described above, if tolerances are provided to create such an arrangement.

With the fourth anchor point 15 arranged in a non-planar relationship to the three engaged anchor points, there is a resultant load applied to the engaged anchor points 15 and 16. The vertically fixed latch 15 is typically provided with a metal to metal contact between the latch structure and the striker pin 20. The vertically compliant latch 16 is typically provided with an elastomerically isolated contact between the latch structure and the striker pin 20, as will be described below. The resultant load applied to the engaged anchor points 15 and 16 is the spring restoring force of the compressed vertical spring characteristic 16a, as described above. The resultant load may further include a force component from the deflected seat frame 17. The resultant force, along with the coefficient of friction of the elastomeric isolation material, creates a resistive force inhibiting release of the vertically compliant latch 16. The vertically fixed latch 15, which is engaged in a metal to metal contact relationship with the striker pin 20, exhibits a lower coefficient of friction than the vertically compliant latch 16 and as such will release with a reduced effort. Once the vertically fixed latch 15 is released, the remaining engaged vertically compliant latch 16 has a reduced resultant force applied. The reduced force is due to relaxing of the deflected state of the vertical spring characteristic 16a and the elimination of any resultant deflections of the seat frame 17. The reduced applied force to the vertically compliant latch 16, applied to the coefficient of friction thereon, lowers the resistive release force.

A prior art blocker-type latch 100 is illustrated in FIGS. 3A and 3B. FIG. 3A depicts the blocker latch 100 in an engaged position with the mating striker pin 20. The blocker latch 100 includes a side plate 110 and is further illustrated with a plate, similar to the side plate 110, removed to more clearly depict the inner latch mechanism and operation. While the blocker latch 100 is shown with the plate removed, the latch is operable as illustrated if so desired. The side plate 110 is preferably fixed to the seat frame 17 and may be fixed by bolting, welding, riveting, adhesive bonding, and the like. The side plate 110 may alternatively be an integral portion of the seat frame 17 and remain within the scope of the present invention. The blocker latch includes a hook, shown generally at 120, that is rotatably connected to the side plate 110 by a hook pin 128. The hook 120 may be rotatably attached to the side plate 110 by arrangements other than a rivet, such as for example a bolt, screw, stamped projection, and the like if so desired. The hook 120 may be made from a metallic material, for example steel, though such is not required.

The hook 120 may include a coated surface 122 and an uncoated surface 124. The coated surface 122 preferably is an elastomeric material, for example rubber, neoprene, or nylon and the like, which is applied to the hook 120 generally where indicated. The coated surface 122 preferably may include contact surface 126 or may be applied to the entire hook 120 if so desired. The coated surface 122, including contact surface 126, provides a noise and rattle isolation function between the hook 120 and the striker pin 20. The hook 120 may include a spring mounting rivet 135 which engages an engagement spring 132. The hook 120 may further include a release spring rivet 133 that engages a release spring 130. While the hook 120 is illustrated as having a rivet structure to attach a resilient member, for example a spring, such an attachment structure is not required. The attachment structure may alternatively be other than a rivet, such as for example a bolt, screw, stamped projection, or aperture, and the like if so desired.

As shown in FIG. 3A, the hook 120 is engaged around the striker pin 20 which is carried within a hook slot, shown generally at 121. The hook slot 121 includes an open end, shown generally at 123, an upper surface 125, a lower surface 126, and a closed end 129. The lower surface 126 is preferably coated with the coating material as provided on surface 122 for the purpose described previously. The upper surface 125 and closed end 129 may also be coated with the coating material if so desired, though such is not required. The lower surface 126 preferably contacts the striker pin 20 with the coating material disposed therebetween. The upper surface 125 and/or the closed end 129 may be in contact with the striker pin 20 but such is not required. The lower surface 126 creates a clamping condition between the striker pin 20 and a rubber bumper, shown generally at 170. The rubber bumper 170 provides a resilient contact between the seat frame 17 and the striker pin 20. The rubber bumper 170 preferably provides a vertical spring characteristic 16a and a vertical damping characteristic 16b as described above.

Figure 4A:
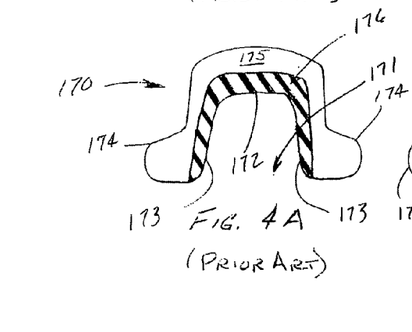
FIG. 4A is a further enlarged sectional elevational view of a first embodiment of a resilient member used with the latch mechanism and striker pin assembly illustrated in FIGS. 3A and 3B.
Figure 4B:
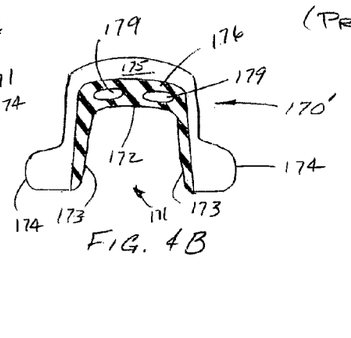
FIG. 4B is a further enlarged sectional elevational view of a second embodiment of a resilient member used with the latch mechanism and striker pin assembly illustrated in FIGS. 3A and 3B.

The prior art rubber bumper 170 is best shown in partial cross section in FIG. 4A. An improved rubber bumper 170' is best shown in FIG. 4B in partial cross section as an alternative embodiment of the present invention. The prior art rubber bumper 170 includes an open end 171, a closed end 172, and a pair of opposed sides 173. The rubber bumper 170 further includes a cross sectional view of a resilient locating portion 176 and one of a pair of opposed locating surfaces 175. The rubber bumper 170 further includes a pair of ears 174, though such is not required. The resilient locating portion 176 is disposed between the side plate 110 and the striker pin 20 as shown in FIG. 3A. The resilient locating portion 176 is loaded in compression by the lower surface 126 of the hook 120 acting against the striker pin 20, as shown in FIG. 3A. The lower surface 126 pulls the latch assembly 100, including the resilient locating portion 176, toward the striker pin 20. The striker pin 20 draws against the rubber bumper 170 loading the resilient locating portion 176 in compression. The compressive loading creates a spring force, as described above, and may further create a damping force between the striker pin 20 and the side plate 110, which is attached to the seat frame 17. The resilient locating portion 176 of the prior art rubber bumper 170, as a compressively loaded, solid elastomeric structure, provides a generally increasing spring force as the lower surface 126 compresses the striker pin 20 onto the closed end 172.

The improved rubber bumper 170' of the present invention locates and functions within the blocker latch 100 in a similar manner to the prior art rubber bumper 170. The improved rubber bumper 170' is further provided with at least one void 179, though a pair of voids 179 is illustrated in FIG. 4B. The void 179 may further be provided as a plurality of voids of any shape and may extend through the rubber bumper 170' or be partially projected into the rubber bumper 170'. The void 179 provides a shear loading characteristic to the resilient locating portion 176. The shear loading characteristic as applied to the spring force characteristic 16a provides a generally constant spring force against the striker pin 20 and the side plate 110 over a deflection region of the improved rubber bumper 170'.

The blocker latch 100 further includes a pawl 150, shown in an engaged position in FIG. 3A. The pawl 150 is rotatably connected to the side plate 110 by a pawl rivet 152. The pawl 150 may be rotatably attached to the side plate 110 by arrangements other than a rivet, such as for example a bolt, screw, stamped projection, and the like if so desired. The pawl 150 further includes an actuating connection point, shown in FIGS. 3A and 3B as an actuation rivet 154. The actuation rivet 154, however, may be other than illustrated if so desired such as a bolt, screw, pin, clip, or aperture and the like. The actuation rivet 154 may be further provided to secure a release cable 160 and the engagement spring 132 to the pawl 150. The pawl 150 may be made from a metallic material, such as for example steel, though other materials of either metallic or non-metallic derivations are anticipated as being within the scope of the present invention.

The disengaged hook 120 is also shown positioned for engagement as illustrated in FIG. 3B. The blocker latch 100, along with the connected seat frame 17 and seat assembly 10, is urged toward the striker pin 20 by a counterclockwise rotation of the forward pivots 14 about axis A-A. The striker pin 20 engages the open end 123 of the hook 120 further generally contacting the upper surface 125. The striker pin 20 causes the hook 120 to rotate in a clockwise direction about the hook pin 128. The spring mounting rivet 135 creates a tensile load in the engagement spring 132. The pawl 150 is rotated toward the hook 120, from the disengaged position as shown in FIG. 3B, in a clockwise direction for actuating the illustrated engagement of FIG. 3A. The blocker latch may alternatively provide the engagement rotational direction of the pawl 150 to be in a counterclockwise direction if another orientation is so desired. The pawl 150 is rotated clockwise by the engagement spring 132 acting between the actuation rivet 154 and the spring mounting rivet 135. The pawl 150 includes a pawl locking surface 156 that engages a pawl seating surface 127 on hook 120. The pawl 150, in the engaged position of FIG. 3A, prevents an unlatching rotation of the hook 120 from the engaged striker pin 20 while in the locked position. The pawl locking surface 156 may contact the pawl seating surface 127 at any point along the boundary therebetween.

The pawl 150 may be released from engaged contact with the hook 120 by actuating the release cable 160 in a conventional manner that is well known in the art. Once the release cable 160 has pulled the pawl 150 out of engagement with the pawl seating surface 127, the hook 120 may rotate in a generally counterclockwise direction about the hook pin 128. The hook 120 is rotated about the hook pin 128 by the release spring 130 acting between the release spring rivet 133 and a side plate release rivet 113. The upper surface 125 of the hook slot 121 contacts the striker pin 20 and thereby assisting lift of the blocker latch 100, and the seat frame 17 connected thereto, out of latched engagement with the striker pin 20.

A prior art cinch-type latch, shown generally at 200, is illustrated in FIGS. 5A and 5B. The cinch-type latch 200 is similar to that described in U.S. Pat. No. 7,044,552 to Müller et al., the description of which is incorporated herein by reference in entirety. The cinch latch 200 includes a side plate 210 and is further illustrated with a plate, similar to the side plate 210, removed to more clearly depict the inner latch mechanism and operation. While the cinch latch 200 is shown with the plate removed, the latch is operable as illustrated if so desired. The side plate 210 is preferably fixed to the seat frame 17 and may be fixed by bolting, welding, riveting, adhesive bonding, and the like. The side plate 210 may alternatively be an integral portion of the seat frame 17 and remain within the scope of the present invention. The cinch latch includes a hook, shown generally at 220, that is rotatably connected to the side plate 210 by a hook pin 228. The hook 220 may be rotatably attached to the side plate 210 by arrangements other than a rivet, such as for example a bolt, screw, stamped projection, and the like if so desired. The hook 220 may be made from a metallic material, for example steel, though such is not required.

The hook 220 may include a spring mounting rivet 233 which engages an engagement spring 232 and a release spring 230. The release spring 230 may be further connected to a return spring rivet 213 mounted on side plate 210. Though illustrated and described as rivet structures, the spring mounting rivet 233 and the return spring rivet 213 may be other than a rivet such as for example a bolt, screw, stamped projection, or aperture, and the like if so desired. The hook 220 may however alternatively provide for a separate mounting rivet (not shown) to attach each spring structure or resilient element as described above if so desired.

As shown in FIG. 5A, the hook 220 is engaged around the striker pin 20 which is carried within a hook slot, shown generally at 221. The hook slot 221 includes an open end, shown generally at 223, an upper surface 225, a lower surface 226, and a closed end 229. The lower surface 226 preferably contacts the striker pin 20. The upper surface 225 and/or the closed end 229 may be in contact with the striker pin 20 though such is not required. The lower surface 226 creates a clamping condition between the striker pin 20 and a clamping channel, shown generally at 270. The clamping channel 270 includes an upper clamp surface 272 and a pair of opposed channel sides 273. The clamping condition is preferably a firmly applied metal to metal contact with no clearances between the striker pin 20 and the lower surface 226 of hook 220 and the upper clamp surface 272 of the clamping channel 270.

A pawl 250 is rotatably connected to the side plate 210 by a pawl rivet 252. The pawl 250 may engage the hook 220 in response to spring actuation forces as described above for the blocker latch 100. Furthermore, the pawl 250 may release from the hook 220 in response to an input from the release cable 200 and a spring release force in a manner similar to the blocker latch 100 as described above. The pawl 250 may include a pawl cam profile 256 that engages a mating hook cam profile 227. The pawl cam profile 256 may contact the hook cam profile 227 at any point along the mating surface of the hook cam profile 227 if so desired. The amount and extent of engagement of the cam profiles 256 and 227 is determined by the relative position of the hook slot 221 to the striker pin 20. As the striker pin 20 is engaged further into the hook slot 221 the pawl cam profile 256 contacts a greater portion of the mating hook cam profile 227. This variable engagement of the mating cam profiles allows the hook 220 to create a consistent metal to metal contact between the lower surface 226 of the hook slot 221 and the striker pin 20. Such a variable contact between the hook 220 and the striker pin 20 assists in providing a cinching action that prevents noise generation by eliminating clearances. The engagement and disengagement of the hook 220 from the striker pin 20 is generally effected in a manner similar to that described above for the blocker latch 100, though such is not required.

Figure 6C:
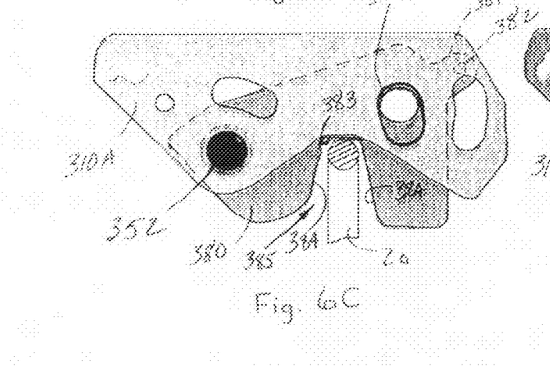
FIG. 6C is a side elevational view of a portion of the latch mechanism and striker pin assembly illustrated in FIGS. 6A and 6B, together with an outer side plate that is shown in a maximum height engagement position relative to the striker pin.
Figure 6D:
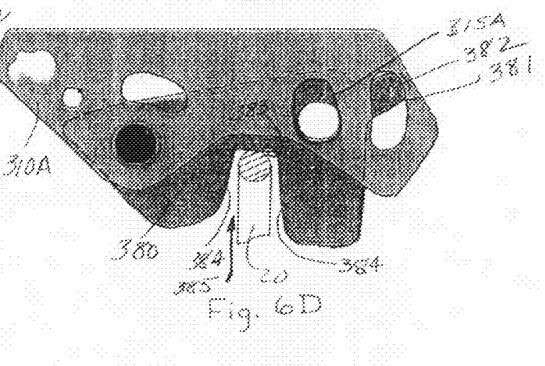
FIG. 6D is a side elevational view of a portion of the latch mechanism and striker pin assembly illustrated in FIGS. 6A and 6B, together with an outer side plate that is shown in a minimum height engagement position relative to the striker pin.

There is illustrated in FIGS. 6A and 6B a compensating latch, shown generally at 300, in accordance with an embodiment of the present invention. The compensating latch 300 may be a vertically compliant anchor point 16 that cooperates with the vertically fixed anchor points 14 and 15 as illustrated in FIG. 2C. The compensating latch 300 includes a side plate 310 and is further illustrated with a second side plate 310A, as shown in FIGS. 6C and 6D, that is similar to the side plate 310. The second side plate 310A is removed in FIGS. 6A and 6B to more clearly depict the inner latch mechanisms and operation. While the compensating latch 300 is shown with the second side plate 310A removed, the latch is operable as illustrated in FIGS. 6A and 6B if so desired. The side plate 310 is preferably fixed to the seat frame 17 and may be fixed by bolting, welding, riveting, adhesive bonding, and the like. The side plate 310 may alternatively be an integral portion of the seat frame 17 and remain within the scope of the present invention. A compensating plate 380 and the side plate 310 are supported on a pawl rivet 352 and free to rotate thereabout. The compensating plate 380 also may be free to rotate relative to the second side plate 310A by pawl rivet 352 if such is so provided as illustrated in FIGS. 6C and 6D. The pawl rivet 352 is fixed to a pawl 350 in order to provide rotational engagement and disengagement actuations. A cam 365 is mounted onto the pawl rivet 352 for free relative rotation with the pawl 350, the side plate 310, and the compensating plate 380. Though illustrated in FIGS. 6A and 6B as separate structures, the pawl 350 and cam 365 may be a single component similar in structure and operation to the pawl 250 of the cinch latch 200 as described above if so desired.

The compensating latch includes a hook, shown generally at 320, that is rotatably connected to the compensating plate 380 by a hook pin 328. The hook 320 may be rotatably attached to the compensating plate 380 by arrangements other than a rivet, such as for example a bolt, screw, stamped projection, and the like if so desired. The hook 320 may be made from a metallic material, for example steel, though such is not required. The hook pin 328 is further disposed within a compensating slot 315 on side plate 310. The compensating slot 315 is configured to permit the hook 320 to slide relative to the side plate 310. The second side plate 310A, if so provided and as illustrated in FIGS. 6C and 6D, also includes a compensating slot 315A having the same function and operation as the compensating slot 315. As shown in FIG. 6A, the hook 320 is engaged around the striker pin 20 which is carried within a hook slot, shown generally at 321. The hook slot 321 includes an open end, shown generally at 323, an upper surface 325, a lower surface 326, and a closed end 329. The upper surface 325 and/or the closed end 329 are preferably not in contact with the striker pin 20 though such is not required. The lower surface 326 preferably contacts the striker pin 20 and creates a clamping condition between the striker pin 20 and a compensating channel, shown generally at 385.

The pawl 350 includes a cam pin 354 which is disposed within a cam window 366 as part of the cam 365. The pawl 350 further includes a pawl locking surface 356 that is positioned relative to a pawl seating surface 327 of the hook 320. The cam 365 includes a cam profile 369 that engages a cinch pin 370 that is part of the hook 320. The pawl locking surface 356 and the pawl seating surface 327 may be preferably spaced apart when the cam profile 369 is engaged with the cinch pin 370. The cam window 366 includes an engagement surface 368 and disengagement surface 367 that cooperates with the cam pin 354 to rotate the cam 365 relative to the pawl rivet 352. A release lever (not shown) may be fixed to the pawl rivet 352 for rotation of the pawl 350. As the pawl rivet 352 and the pawl 350 are rotated in a counterclockwise direction, the cam pin 354 contacts the disengagement surface 367 in order to rotate the cam 365 and the cam profile 369 away from engagement with the cinch pin 370 as illustrated in FIGS. 6A and 6B. Resilient spring members (not shown) act to preload the pawl 350 for subsequent engagement of the cam profile 369 with the cam pin 370 and hook 320 of FIG. 6B. There is further at least one resilient spring element (not shown) that preloads the hook 320 in the disengaged position as illustrated in FIG. 6B. The resilient spring elements may be similar in structure and orientation as those of the cinch latch 200 as described above if so desired.

The hook 320, shown in the disengaged position in FIG. 6B, is actuated for engagement with the striker pin 20 in a manner similar to the cinch latch 200 as described above. Once the striker pin 20 urges the hook 320 in a clockwise direction, the cam pin 354 contacts the engagement surface 368 of the cam 365 in order to rotate the cam profile 369 into contact with the cinch pin 370. As the cam profile 369 is positioned in contact with the cinch pin 370, the pawl locking surface 356 and the pawl seating surface 327 are preferably spaced apart. Alternatively the pawl locking surface 356 and the pawl seating surface 327 may be engaged in a line-to-line contact condition where a minimal to negligible load is transferred therebetween.

The compensating channel 385 includes an upper clamp surface 383 and a pair of opposed compensating channel sides 384. The clamping condition generated is preferably a firmly applied metal to metal contact with no clearances between the striker pin 20, the lower surface 326 of hook 320, and the upper clamp surface 383 of the compensating channel 385. The compensating plate 380 further includes a compensating spring mount 381 having a spring aperture 382 formed therethrough. A compensating spring 330 is connected to the spring aperture 382 and a side plate aperture 317 formed in side plate 310. The compensating spring 330, in a free state, extends the compensating plate 380 to a furthest point below the side plate 310 or 310A, as shown in FIG. 6D. The compensating plate 380 illustrated in FIG. 6D engages the striker pin 20 that may be in a position below the three point plane of engagement. FIGS. 6A and 6C show the compensating plate 380 in a retracted condition engaging the striker pin 20 that may be in a position above the three point plane of engagement.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat latching system comprising:
 a vehicle seat assembly having a frame;
 a first pair of anchor points, each anchor point having a fixed restraining characteristic in a first direction and operatively connected to the frame in a first and a second position;
 a second pair of anchor points, each anchor point operatively connected to the frame in a third and fourth position, wherein one of the second pair of anchor points in the third position having a fixed restraining characteristic in the first direction and the remaining one of the second pair of anchor points in the fourth position having a compliant restraining characteristic in the first direction;
 wherein the anchor points of the first, second, and third positions cooperate to form a plane of engagement with a first, second, and third corresponding mating element; and
 the anchor point of the fourth position operatively engaging a fourth corresponding mating element; wherein the fourth corresponding mating element is in a non-planar relationship with the plane of engagement of the first, second and third corresponding mating elements.

2. The seat latching system of claim 1 wherein the first direction is a vertical direction.

3. The seat latching system of claim 1 wherein the corresponding mating elements are striker pins, the striker pins being fixed to a surface.

4. The seat latching system of claim 1 wherein the first and second anchor points are removable from the corresponding mating elements.

5. The seat latching system of claim 1 wherein the first and second anchor points are fixed to the corresponding mating elements.

6. The seat latching system of claim 1 wherein the compliant restraining characteristic is a spring rate characteristic of a resilient member.

7. The seat latching system of claim 6 wherein the resilient member is an elastomer disposed between the third anchor point and the third corresponding mating element.

8. The seat latching system of claim 6 wherein the resilient member is a mechanical spring.

9. The seat latching system of claim 1 wherein the anchor point of the third or fourth position is a blocker latch; and
 the anchor point of the remaining third or fourth position is a cinch latch.

10. The seat latching system of claim 1 wherein the anchor point of the third or fourth position is a cinch latch; and
 the anchor point of the remaining third or fourth position is a compensating latch.

11. A vehicle seat compensating latch apparatus comprising:
 a side plate;
 a compensating plate pivotally connected to the side plate;
 a hook, wherein the hook is pivotally connected to the compensating plate; and
 a resilient member, wherein the resilient member engages the compensating plate and the side plate and further positions the compensating plate in a cooperating relationship with the hook to engage a mating element.

12. The compensating latch apparatus of claim 11 wherein the hook is operable in a sliding and pivoting movement relative to the side plate.

13. The compensating latch apparatus of claim 11 wherein a pawl is pivotally connected to the side plate.

14. The compensating latch apparatus of claim 13 wherein the pawl includes a first cam surface.

15. The compensating latch apparatus of claim 13 wherein the pawl is cooperatively engaged with a cam.

16. The compensating latch apparatus of claim 15 wherein the cam engages the hook when the hook is engaged with the mating element.

17. The compensating latch apparatus of claim 11 wherein the mating element is a striker pin.

18. The compensating latch apparatus of claim 11 wherein the resilient member is a coil spring.

19. A vehicle seat blocker latch apparatus comprising:
 an anchor point fixed to a vehicle floor;
 a side plate;
 a hook, wherein the hook is pivotally mounted to the side plate;
 a pawl pivotally engaged on the side plate for locking engagement with the hook; and
 a resilient member disposed between the anchor point and the side plate, wherein the resilient member includes at least one aperture formed in the resilient member, the aperture positioned between the side plate and the anchor point.

20. The blocker latch apparatus of claim 19 wherein the resilient member is formed from an elastomer.

* * * * *